G. W. HUMPHREY.
Encasing Caustic Alkali.

No. 137,137.  Patented March 25, 1873.

UNITED STATES PATENT OFFICE.

GEORGE W. HUMPHREY, OF POMPEY, ASSIGNOR TO HIMSELF AND J. MUNROE TAYLOR, OF NEW YORK, N. Y.

IMPROVEMENT IN INCASING CAUSTIC ALKALI.

Specification forming part of Letters Patent No. 137,137, dated March 25, 1873.

*To all whom it may concern:*

Be it known that I, GEORGE W. HUMPHREY, of Pompey, in the county of Onondaga and State of New York, have invented a new and useful Improvement in Caustic-Soda Packages, of which the following is a specification:

My invention consists of an improvement in the mode of incasing caustic alkali (soda or potash) in hermetically-sealed envelopes, so as to secure it most perfectly against atmospheric deterioration and deliquescence, which also renders its highly corrosive nature harmless.

Figure 1:
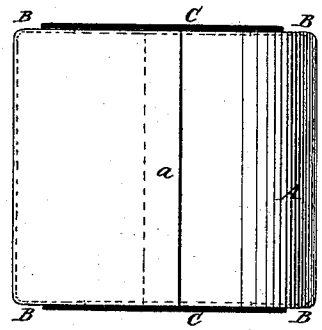
Figure 2:
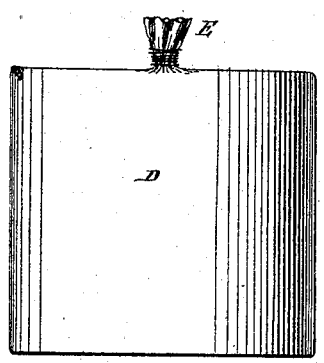
Figure 3:
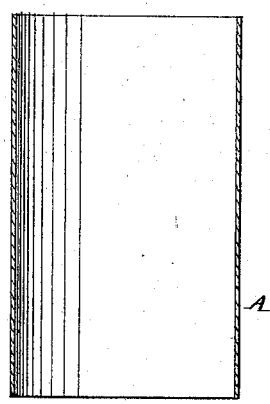
Figure 4:
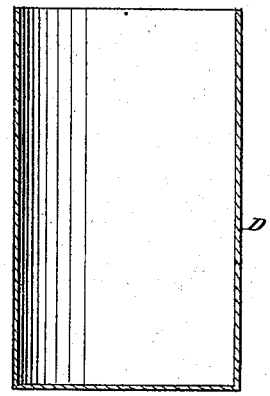

In the accompanying drawing, Figures 1 and 2 represent packages of caustic soda incased according to my invention, and Figs. 3 and 4 represent some of the envelopes in section.

Similar letters of reference indicate corresponding parts.

I am well aware that caustic alkali, or hydrate of soda or potash, has long been well known and generally used in both Europe and America for various manufactures, and also in domestic use; but owing to the fact that the article will rapidly deliquesce when exposed to the action of the atmosphere, those who manufactured it were compelled to place it immediately in air-tight vessels, such as wood casks, iron drums, wide-mouthed glass bottles, and jars with air-tight glass stoppers. I am also aware that more recently different improvements have been invented in the mode of putting up this article in convenient form for sale and use, such as wrappings of cambric, paper, or other suitable material rendered air-tight by dipping in a melted preparation of bees-wax and resin or melted tar; also in metallic casings made air-tight by infusible cement; also in glass, stone, and other vessels rendered air-tight by different devices.

After many experiments with different materials, I have found India rubber to be impervious to the action of caustic alkali (soda or potash) and admirably suited in its nature to make the anti-corrosive air-tight covering best adapted to its preservation and utility. I use for this purpose India-rubber cloth or fabric measuring about two and one-half square yards to the pound, which I cut into suitable-sized pieces to make the envelope desired for a solid piece of caustic alkali, cast in the form of a cylinder, of one pound weight, which is nearly three inches long by three inches in diameter. I use a piece of this rubber cloth cut six inches long by four inches wide; I then cement the ends together with India-rubber cement, lapping the surfaces one-fourth inch, as at *a;* this forms the envelope A, open at each end. I then place in it an expander, which is made on the same principle as a glove finger-expander, only it has three or more fingers instead of two; with this I stretch the envelope and place it over the piece of cylindrical caustic alkali, and then draw out the fingers from between it and the rubber. The rubber envelope then contracts readily to the shape of the package, the ends projecting beyond the piece to be enveloped contracting more than the other part, and forming a flange, B, around the rim of each end. I then take a round disk-shaped piece of the rubber-cloth C nearly the diameter of the package, and, with India-rubber cement, cement it to the rim or flange B before mentioned, excluding entirely the atmosphere, and rendering alike impervious to air and moisture, and harmless to do injury by means of its highly-caustic properties.

The application of the rubber envelope may, however, be effected differently; for instance, a sack or pocket, D, may be formed as represented in Fig. 4, without any lap or seam, but open at one end for the introduction of the piece to be enveloped, and to be afterward made fast to exclude the atmosphere by tying, as shown at E, pasting the edges of the mouth together with rubber cement or pasting on a cap, C; or any equivalent or approved way of fastening may be employed. I do not therefore limit myself to any particular form of rubber envelope or mode of applying it.

When thus enveloped with the India rubber I wrap the whole with common Manila paper, upon which I place full directions how to use it and for what purposes. When thus put up with an India-rubber covering it may be kept for any length of time and used as may be desired, a part or the whole at a time, as any portion may be replaced and again sealed up. It may also be transported to any part of the world safely by packing in ordinary wooden boxes.

Besides being cheaper than other coverings heretofore used, particularly metallic, which are about twice as expensive as the rubber, the latter is ready, as found in the market, for applying at once when made of the rubber sheets, except the cutting and pasting of the strip A, which are very simple operations; and when sacks are to be used they will be formed in the manufacture of the goods, so that the labor necessary for the preparation of the cambric, paper, and the like to render them impervious to air is avoided.

Having thus described my invention, what I claim as new, and desire to secure by Letters Patent, is—

The mode or process herein described of putting up caustic alkali (soda or potash) for sale and use, and preserving it from the action of the atmosphere in air-tight India-rubber envelopes or coverings, substantially as described.

GEO. W. HUMPHREY.

Witnesses:
T. B. MOSHER,
ALEX. F. ROBERTS.